(12) United States Patent
Kwak et al.

(10) Patent No.: US 8,542,639 B2
(45) Date of Patent: Sep. 24, 2013

(54) FRAME FOR FLEXIBLY SUPPORTING HETEROGENEOUS MODES AND TDD/FDD MODES, AND METHOD FOR TRANSMITTING SIGNALS USING THE SAME

(75) Inventors: Jin Sam Kwak, Anyang-si (KR); Min Seok Noh, Anyang-si (KR); Yeong Hyeon Kwon, Anyang-si (KR); Dong Cheol Kim, Anyang-si (KR); Sung Ho Moon, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1105 days.

(21) Appl. No.: 12/348,100

(22) Filed: Jan. 2, 2009

(65) Prior Publication Data

US 2009/0219875 A1 Sep. 3, 2009

Related U.S. Application Data

(60) Provisional application No. 61/018,675, filed on Jan. 3, 2008.

(30) Foreign Application Priority Data

May 1, 2008 (KR) .................. 10-2008-0041048

(51) Int. Cl.
*H04W 4/00* (2009.01)
(52) U.S. Cl.
USPC ........................... 370/329; 370/203; 370/208
(58) Field of Classification Search
USPC ................. 370/208, 280, 278, 276, 277, 281,
370/294, 295, 310, 320, 321, 337, 344, 347,
370/328, 336, 345, 350, 503, 329, 343, 331,
370/478, 477, 464, 442, 441, 431, 319; 455/446,
455/550.1, 561, 7; 375/260, 295
See application file for complete search history.

(56) References Cited

U.S. PATENT DOCUMENTS

| 7,974,312 B2 * | 7/2011 | Ahmadi et al. ............... 370/477 |
| 8,149,782 B2 * | 4/2012 | Noh et al. .................... 370/330 |
| 2006/0121937 A1 | 6/2006 | Son |

(Continued)

FOREIGN PATENT DOCUMENTS

| JP | 2006-518562 A | 8/2006 |
| KR | 2001-0004621 A | 1/2001 |

*Primary Examiner* — Abdullah Riyami
(74) *Attorney, Agent, or Firm* — Birch, Stewart, Kolasch & Birch, LLP

(57) ABSTRACT

A frame structure for flexibly supporting heterogeneous modes and TDD/FDD modes and a method for transmitting signals using the same are disclosed. A method for transmitting a signal using a preset frame structure in a communication system which supports a TDD mode and an FDD mode and supports two or more different communication schemes includes constructing a signal in units of the frames and transmitting the signal, wherein at least one of determination of a ratio of a DL region and a UL region within the frame when the communication system communicates according to the TDD mode allocation of a time region according to the modes of the communication schemes when the communication system communicates according to a heterogeneous mode supporting the two or more communication schemes and setting of a construction scheme of sub-frames within the frame in units of a prescribed number of the frames or super-frames, is performed on the basis of a specific unit comprised of n OFDM symbols corresponding to a multiple of a UL subchannelization unit.

15 Claims, 13 Drawing Sheets

(56) References Cited

U.S. PATENT DOCUMENTS

| | | |
|---|---|---|
| 2006/0126558 A1 | 6/2006 | Lee et al. |
| 2006/0148414 A1* | 7/2006 | Tee et al. ............... 455/69 |
| 2006/0239181 A1* | 10/2006 | Hosur ..................... 370/208 |
| 2007/0060073 A1* | 3/2007 | Boer et al. ............. 455/101 |
| 2007/0206686 A1* | 9/2007 | Vook et al. ............. 375/260 |
| 2008/0095195 A1* | 4/2008 | Ahmadi et al. ......... 370/478 |
| 2008/0144612 A1* | 6/2008 | Honkasalo et al. ..... 370/370 |
| 2008/0176575 A1* | 7/2008 | Sutton .................... 455/450 |
| 2008/0227386 A1* | 9/2008 | Dayal et al. ............ 455/7 |
| 2008/0247450 A1* | 10/2008 | Alexander et al. ..... 375/224 |
| 2008/0285511 A1* | 11/2008 | Puri et al. .............. 370/329 |
| 2008/0316961 A1* | 12/2008 | Bertrand et al. ....... 370/329 |
| 2009/0059781 A1* | 3/2009 | Tseng et al. ........... 370/201 |
| 2009/0067377 A1* | 3/2009 | Talukdar et al. ....... 370/329 |
| 2009/0088172 A1* | 4/2009 | Lusky et al. ........... 455/446 |
| 2009/0111473 A1* | 4/2009 | Tao et al. ............... 455/440 |
| 2009/0124290 A1* | 5/2009 | Tao et al. ............... 455/562.1 |
| 2009/0149188 A1* | 6/2009 | McBeath et al. ....... 455/450 |
| 2009/0168745 A1* | 7/2009 | Ahmadi et al. ......... 370/350 |
| 2009/0185632 A1* | 7/2009 | Cai et al. ............... 375/260 |
| 2009/0303918 A1* | 12/2009 | Ma et al. ................ 370/315 |
| 2010/0260164 A1* | 10/2010 | Moon et al. ............ 370/345 |
| 2010/0296477 A1* | 11/2010 | Hason et al. ........... 370/330 |
| 2011/0002243 A1* | 1/2011 | Sherman et al. ....... 370/280 |
| 2011/0051667 A1* | 3/2011 | Park et al. .............. 370/328 |
| 2011/0090879 A1* | 4/2011 | Hamiti et al. .......... 370/338 |
| 2011/0096867 A1* | 4/2011 | Kang et al. ............ 375/295 |

* cited by examiner (a)

(b)

(a)

(b)

(a)

(b)

FRAME FOR FLEXIBLY SUPPORTING HETEROGENEOUS MODES AND TDD/FDD MODES, AND METHOD FOR TRANSMITTING SIGNALS USING THE SAME

CROSS-REFERENCE TO RELATED APPLICATIONS

This application claims the benefit of the U.S. Provisional Application No. 61/018,675, filed on Jan. 3, 2008, which is hereby incorporated by reference as if fully set forth herein.

This application claims the benefit of Korean Patent Application No. 10-2008-0041048, filed on May 1, 2008, which is hereby incorporated by reference as if fully set forth herein.

BACKGROUND OF THE INVENTION

1. Field of the Invention

The present invention relates to a frame structure for flexibly supporting heterogeneous modes and time division duplexing (TDD)/frequency division duplexing (FDD) modes, and a method for transmitting and receiving signals using the same.

2. Discussion of the Related Art

In order to maximize the efficiency of limited radio resources in a broadband communication system, methods for efficiently transmitting/receiving signals in space, time, and frequency domains and utilization methods therefore have been proposed. A multicarrier-based orthogonal frequency division multiplexing (OFDM) scheme reduces the complexity of a receiver under frequency selective fading environments of a broadband channel, and increases spectral efficiency using different channel characteristics of subcarriers through selective scheduling in the frequency domain. In addition, the OFDM scheme can be extended to orthogonal frequency division multiple access (OFDMA) by allocating different subcarriers to multiple users, thereby increasing the efficiency of radio resources in the frequency domain.

As to wireless metropolitan area network (MAN)-OFDMA standard applying OFDMA, IEEE 802.16-2004, IEEE 802.16e-2005 amendment (hereinafter, referred to as 'IEEE 802.16e'), etc. have been completed.

FIG. 1 illustrates a logical frame structure of an IEEE 802.16e system.

The logical frame structure of the IEEE 802.16e system includes a control signal part of a preamble 101, a frame control header (FCH) 102, a downlink (DL)-MAP 103, and an uplink (UL)-MAP 104 and includes data bursts. Data transmission of each user is defined by different subcarrier allocation schemes (e.g., partial usage of subchannel (PUSC), (optional)-full usage of subchannel ((O)-FUSC), tile usage of subchannel (TUSC), adaptive modulation and coding (AMC), etc.) according to a subchannel configuration method. Various permutation zones may be constructed in one frame.

A frame of the IEEE 802.16e system as illustrated in FIG. 1 is necessary to receive control information of the preamble 101, FCH 102, DL-MAP 103, and UL-MAP 104. A role of each field is as follows.

Preamble 101; synchronization, channel estimation, cell identifier (ID) acquisition, etc.

FCH 102: Provision of channel allocation information and channel code information, related to the DL-MAP 103.

DL-MAP 103 and UL-MAP 104: Provision of channel allocation information of data bursts in uplink (UL) and downlink (DL).

The logical frame structure except for the preamble 101 among the above-described control fields may be variously constructed according to selected subcarrier allocation schemes (e.g., PUSC, (O)-FUSC, TUSC, AMC, etc.) in consideration of a frequency diversity gain, a scheduling gain, pilot overhead, or ease of application of multiple/adaptive antenna.

FIG. 2 illustrates a configuration of various permutation zones in an IEEE 802.116e system.

A proper subchannel allocation scheme is established in consideration of a frequency diversity gain, a scheduling gain, pilot overhead, or ease of application of multiple/adaptive antenna. This may be understood that various permutation zones are present as illustrated in FIG. 2 through a zone switch information element (IE) in a MAP.

The configuration of a preamble, an FCH, and a DL-MAP is indispensable in each frame as illustrated in FIG. 2 and thus a receiver can accurately acquire data or control information within the frame.

The conventional IEEE 802.16e frame structure as described above constructs DL and UL sub-frames in a 5 msec-frame structure to support TDD and constructs different subchannelization by time division multiplexing (TDM).

However, in order to extend a conventional TDD frame structure to a structure for supporting DL/UL paired spectrum such as FDD, a structure which is easy to apply an inherent performance enhancement technique in FDD should be designed. Specifically, in FDD, a sub-frame configuration is demanded which is a shorter unit than in TDD and is defined as a transmission Lime interval (TTI). Moreover, it is possible to design a basic unit transmitting the same modulation and coding scheme (MCS) level.

The TTI configuration of a short length of 5 msec or less may lead to reduction in a hybrid automatic repeat request (HARQ) latency and a channel quality indicator (CQI) latency in FDD. The reduction in HARQ latency and CQI latency increases spectral efficiency and transmission capacity. Further, frequency-selective scheduling, multi-user diversity, a closed-loop multiple-input multiple-output (MIMO) gain, etc. can be favorably obtained. Accordingly, a frame structure design suitable for TDD and FDD is demanded and proposal for a frame structure which can support commonality and conventional modes is needed.

SUMMARY OF THE INVENTION

Accordingly, the present invention is directed to a frame structure for flexibly supporting heterogeneous modes and TDD/FDD modes, and a method for transmitting/receiving signals using the same that substantially obviate one or more problems due to limitations and disadvantages of the related art.

An object of the present invention is to provide a new frame structure which can support heterogeneous modes and is suitable for different duplex schemes. Through the frame structure proposed according to the present invention IEEE 802.16e (i.e., conventional WiMAX Rel. 1.0 or Rel. 1.x) is flexibly supported and a method for designing a new IEEE 802.16m frame structure is proposed. Furthermore, a structure is proposed which considers commonality of a frame structure according to a duplex scheme and can perform smooth migration to a single-mode frame configuration as well as can support heterogeneous modes.

Another object of the present invention is to provide a method for transmitting/receiving signals using the above-proposed frame structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a signal using a preset frame structure in a communication system which supports a TDD mode and an FDD mode and supports two or more different communication schemes includes constructing a signal in units of the frames and transmitting the signal, wherein at least one of determination of a ratio of a DL region and a UL region within the frame when the communication system communicates according to the TDD mode, allocation of a time region according to the modes of the communication schemes when the communication system communicates according to a heterogeneous mode supporting the two or more communication schemes, and setting of a construction scheme of sub-frames within the frame in units of a prescribed number of the frames or super-frames, is performed on the basis of a specific unit comprised of n OFDM symbols corresponding to a multiple of a UL sub-channelization unit.

The two or more communication schemes may include a communication scheme of an IEEE 802.16e system, and n may be a divisor of the number of OFDM symbols included within a frame of the IEEE 802.16e system and may be determined considering the number of maximally supported OFDM symbols for UL in the communication scheme of the IEEE 802.116e system. The n may be 3.

Each of the sub-frames within the frame may be comprised of (2×n) OFDM symbols. The frame may include a first region for a communication mode of the IEEE 802.16e system and a second region for a communication mode except for the communication mode of the IEEE 802.16e system, wherein the first and second regions are divided according to a TDM scheme.

When the communication system communicates according to the TDD mode, a transmit transition gap (TTG) and a receive transition gap (RTG) at a switching time point of DL and UL may be allocated in the first region.

When the communication system communicates in a mode which does not support a specific communication scheme, the frame may be set to have a minimum cyclic prefix length within a range which can support a channel having a maximum influence of a delay spread among used channels.

When the communication system communicates in a mode which does not support the specific communication scheme, the cyclic prefix length may be set to $\frac{1}{16}$ of an effective OFDM symbol length.

Each of the sub-frames within the frame may be comprised of m OFDM symbols corresponding to 2×n, and OFDM symbols of a number corresponding to a difference between the number of OFDM symbols within the frame and a multiple of m may be used for at least one of a preamble, midamble, UL or DL sounding signal transmission, TTG, RTG, data transmission, and control signal transmission.

In another aspect of the present invention, a method for transmitting a signal using a preset frame structure in a communication system which supports a TDD mode and an FDD mode and supports two or more different communication schemes, includes constructing a signal in units of frames and transmitting the signal, wherein when the communication system communicates in a mode which does not support an IEEE 802.16e communication scheme, the frame is set to have a minimum cyclic prefix length within a range which can support a channel having maximum influence of a delay spread among used channels.

The cyclic prefix length may be set to $\frac{1}{16}$ of an effective OFDM symbol length. Subframes within the frame may be comprised of units of 6 OFDM symbols.

The frame may include 51 OFDM symbols, and OFDM symbols of a number corresponding to a multiple of an odd number of a specific unit comprised of three OFDM symbols may be used for at least one of a preamble, midamble, UL or DL sounding signal transmission, transmit transition gap, receive transition gap, data transmission, and control signal transmission. When OFDM symbols of a number corresponding to a multiple of an odd number of a specific unit comprised of three OFDM symbols are used for data transmission, one or more sub-frames within the frame may be comprised of units of more than 6 OFDM symbols.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
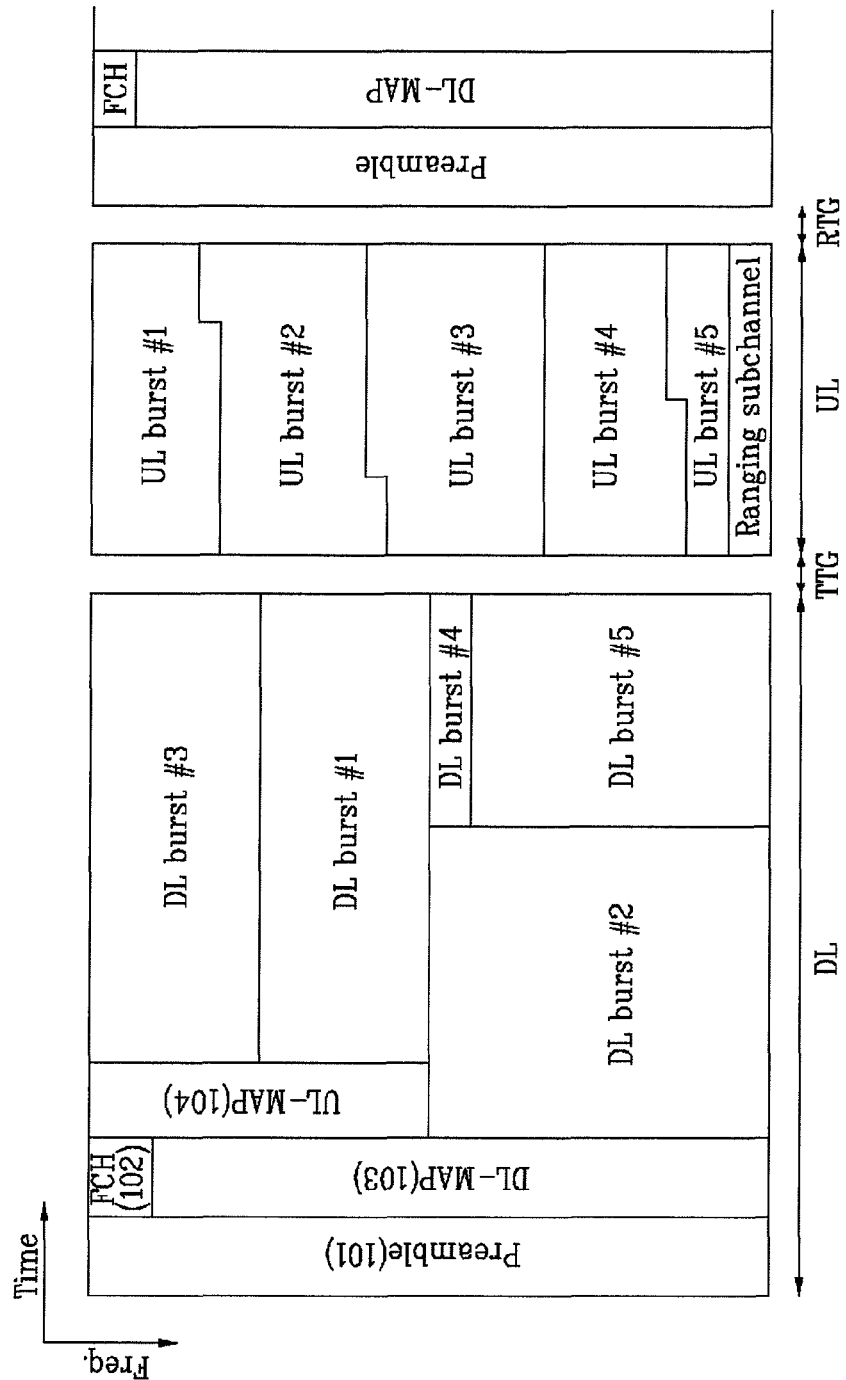
FIG. 1 illustrates a logical frame structure of an IEEE 802.16e system.
Figure 2:
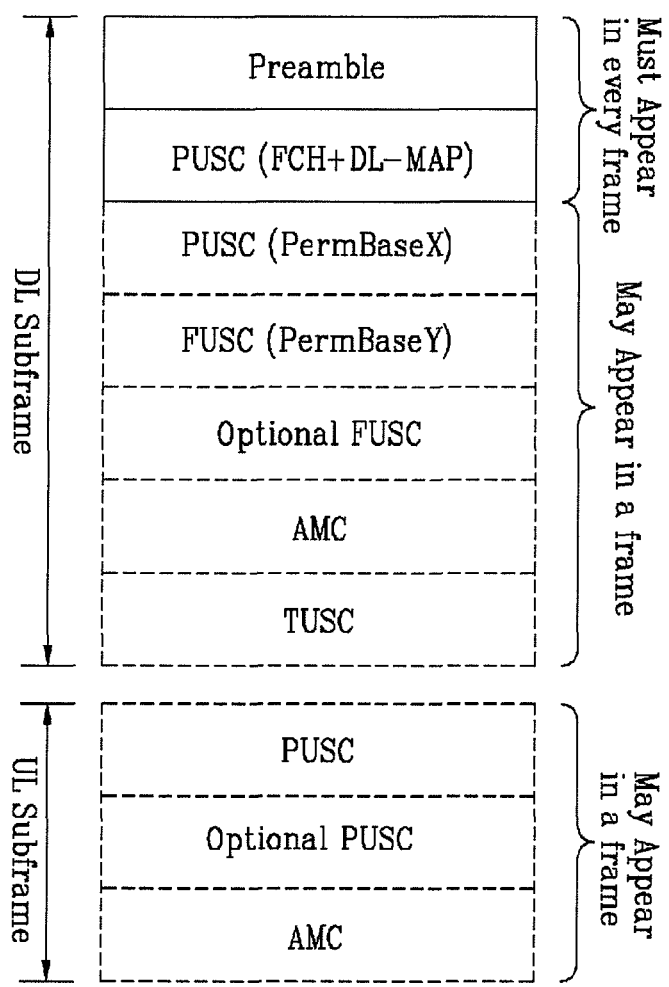
FIG. 2 illustrates a configuration of various permutation zones in an IEEE 802.116e system.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Meanwhile, in some instances, known structures and devices are omitted or are shown in block diagram form, focusing on important features of the structures and devices, so as not to obscure the concept of the present invention. The same reference numbers will be used throughout this specification to refer to the same or like parts.

The present invention proposes a method which can support a new OFDMA-based system (hereinafter, referred to as 'IEEE 802.16m system') in an IEEE 802.16e system based resource structure and can design an effective time-frequency resource structure for supporting an FDD mode of a short length in allocation of various frequency bandwidths. According to the proposed method, a new mode configuration is possible irrespective of presence/absence of an IEEE 802.16e mode at any frequency bandwidth.

To this end, a method for utilizing time-frequency resources will be described to design an integrated TDD/FDD frame structure supporting a new mode while supporting a conventional IEEE 802.16e frame structure. However, an IEEE 802.16e system as a conventional frame structure and an IEEE 802.16m system as a new system are purely exemplary, and a frame structure design method according to the present invention and a frame structure using the frame structure design method may be applied to any other systems by the same principle as the present invention.

Assuming that the IEEE 802.16e system is set as a conventional system and the IEEE 802.16m system is set as a new system, the following conditions may be considered when designing a frame structure for supporting heterogeneous modes and different duplex modes.

1. A frame unit of 5 msec in an IEEE 802.16e frame structure is maintained.

2. Proposal for a frame structure considering numerology in an IEEE 802.16e system is needed. For example, requirements for a subcarrier spacing, a sampling ratio, a cyclic prefix (CP) length, an effective symbol duration, etc. in the IEEE 802.16e system are maintained in a new system.

3. When designing a new frame structure, the IEEE 802.16e system (legacy support mode) is supported.

4. When supporting a TDD structure, a UL/DL ratio is flexibly set.

5. When supporting an FDD structure, a TTI is constructed in consideration of latency and overhead.

6. When designing a TDD/FDD frame structure, commonality is maximally maintained.

7. When supporting an IEEE 802.16e mode, conventional subchannelization is supported.

8. When a frame structure is constructed to support only a new structure, smooth migration to the IEEE 802.16e mode is possible.

9. When a frame structure is constructed to support only a new communication mode without supporting a conventional communication mode, optimal design is possible.

Figure 3:
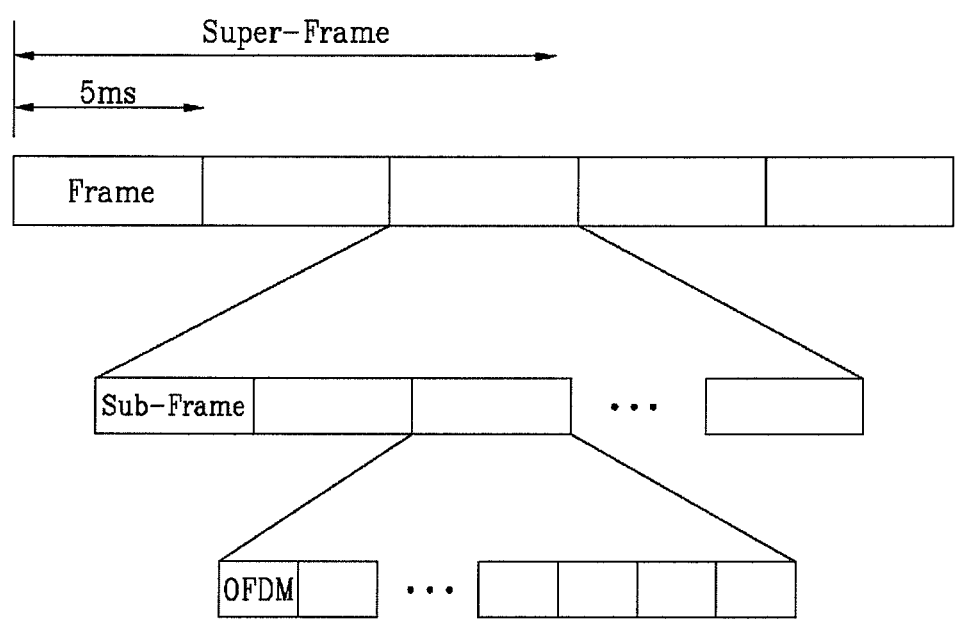
FIG. 3 is a conceptual view explaining definition of an upper level frame structure applied to a new system.

FIG. 3 is a conceptual view explaining definition of an upper level frame structure applied to a new system.

As illustrated in FIG. 3, a super-frame structure is applied to the new system. One super-frame is comprised of a plurality of frames. One frame is divided into a plurality of sub-frames. A 5 msec frame structure in a conventional IEEE 802.16e mode is maintained in the new system.

A specific structure may be designed considering the above-described first to ninth conditions. The super-frame structure is set in transmission units of system configuration information for fast cell selection and low latency service and broadcasting information. Generally, 2 to 6 frames constitute one super-frame.

In the present invention which will be described hereinbelow, a detailed method for constructing a plurality of sub-frames within one frame in the structure illustrated in FIG. 3 will be explained. Moreover, a description will be given of how many OFDM symbols constitute one sub-frame, and whether to require application of more accurate granularity less than a sub-frame in the time domain.

Available minimum time granularity for a sub-frame configuration within a 5 msec frame interval will now be described.

First, basic OFDM numerology in a conventional IEEE 802.16e system is as follows.

TABLE 1

| | Transmission Bandwidth (MHz) | | |
|---|---|---|---|
| | 5 | 10 | 20 |
| Sampling Frequency (MHz) | 5.6 | 11.2 | 22.4 |
| FFT Size | 512 | 1024 | 2048 |
| Sub-Carrier Spacing (kHz) | 10.94 | 10.94 | 10.94 |
| Tu (us) | 91.4 | 91.4 | 91.4 |

| CP length | Ts (us) | Number of OFDM Symbols per Frame | Idle Time (us) |
|---|---|---|---|
| Tg = ¼ Tu | 91.4 + 22.85 = 114.25 | 43 | 87.25 |
| Tg = ⅛ Tu | 91.4 + 11.42 = 102.82 | 48 | 64.64 |
| Tg = 1/16 Tu | 91.4 + 5.71 = 97.11 | 51 | 47.39 |
| Tg = 1/32 Tu | 91.4 + 2.86 = 94.26 | 53 | 4.22 |

Table 1 shows basic OFDMA numerology for a transmission bandwidth, a sampling frequency, a fast Fourier transform (FFT) size, a subcarrier spacing, etc. in the conventional IEEE 802.16e system. Table 1 also shows an available CP length, the number of OFDM symbols per frame, and an idle time. In Table 1, Tu denotes the length of an effective OFDMA symbol and may be defined as 1/(sub-carrier spacing).

Of the CP lengths specified in the conventional IEEE 802.16e system, that is, ¼ Tu, ⅛ Tu, 1/16 Tu, and 1/32 Tu, the CP length demanded to be supported in a legacy mode of the new system is ⅛ Tu, which is indicated in bold in Table 1 (refer to IEEE 802.16m-07/002r4-TGm System Requirements Document (SRD)). In the following description, 'legacy support mode' or 'legacy mode' refers to a mode supporting a communication scheme specified indispensably in the IEEE 802.1.6e system demanded in the SRD.

When using the CP length of ⅛ Tu, 48 OFDM symbols and an idle time of 64.64 μs are included in a 5 msec frame as can be understood from Table 1. Accordingly, in a new frame structure co-existing with a new mode, especially in a frame structure supporting the legacy mode, proposal for the new frame structure under conventional numerology is needed.

In the legacy mode, since one slot, which is a basic unit of a UL subchannelization configuration in a TDD-based frame structure, is comprised of three OFDM symbols (UL PUSC and AMC), a basic frame configuration may consider the three OFDM symbols as basic time granularity. Accordingly, one exemplary embodiment of the present invention, which will be described hereinbelow, proposes to refer to the three OFDM symbols as a 'mini-frame' and to use the mini-frame as a basic time unit during a frame configuration. Meanwhile, the 'mini-frame' is used for convenience of description and any other terms may be used as long as they function as a basic time unit in a frame structure design. In some case, when a 'sub-frame' within a frame is used as the basic time unit, the 'mini-frame' may refer to the sub-frame.

When setting a unit of the above-described 'mini-frame', considerations are as follows.

① The number of symbols within one frame in a conventional mode is a multiple of 3.

That is, as mentioned with reference to Table 1, the number of OFDM symbols within a 5 msec frame of the conventional mode using the CP length of ⅛ Tu is 48, which is a multiple of 3. Therefore, the mini-frame as the most basic time unit according to the exemplary embodiment of the present invention may be a multiple of 3.

② One slot of a UL subchannel of the conventional IEEE 802.16e is comprised of three OFDM symbols.

In the legacy mode, UL PUSC and AMC, which are UL subchannelization specified to be supported indispensably, have slots comprised of units of three OFDM symbols. As described above, in the legacy mode defined in TDD, a UL sub-frame that is a multiple of 3 is constructed. Therefore, as in this exemplary embodiment, three OFDM symbols are set as basic time granularity. A new frame configuration for a new mode, which can support heterogeneous modes, considers the basic time granularity so that a DL/UL ratio can be constructed in units of a multiple of 3.

③ To maximally support the DL/UL ratio in a legacy TDD mode, DL/UL may be constructed in units of three OFDM symbols.

The number of DL/UL OFDM symbols in conventional TDD is (35, 12) to (26, 21) and, in case of UL, a sub-frame comprised of 12 to 21 OFDM symbols is considered. To support the legacy mode co-existing with a new mode, a maximum DL/UL ratio may be flexibly supported when three OFDM symbols are set as the basic time unit.

Figure 4:
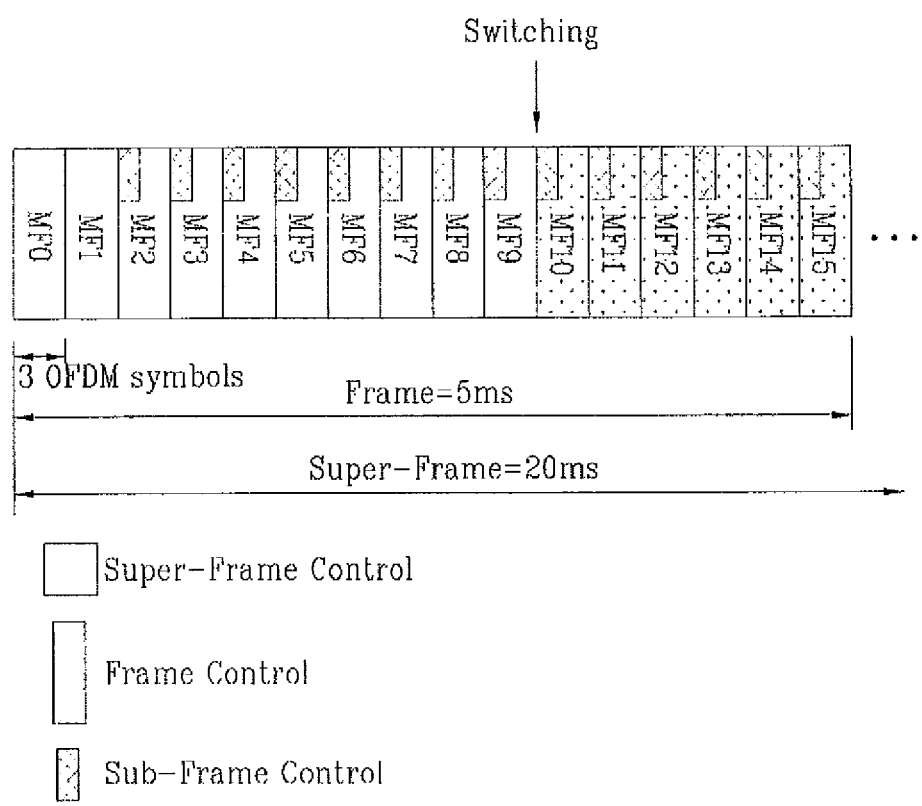
FIG. 4 illustrates a structure specifying mini-frames within a 5 msec frame structure using a CP length of $\frac{1}{8}$ Tu according to an exemplary embodiment of the present invention.

FIG. 4 illustrates a structure specifying mini-frames within a 5 msec frame structure using a CP length of ⅛ Tu according to an exemplary embodiment of the present invention.

As illustrated in FIG. 4, 48 OFDM symbols within one frame may be split into 16 mini-frames each consisting of three OFDM symbols. In FIG. 4, a 20 msec super-frame structure is shown by way of example. A mini-frame MF0 includes control information about a corresponding frame, a mini-frame MF1 includes control information about a super-frame, and the other mini-frames include control information related to sub-frames. A super-frame unit, the location of a control channel, and presence/absence of the control channel may vary according to a system configuration.

In FIG. 4, a part denoted by 'Switching' indicates a switching time point of a DL/UL region in TDD. Since the frame is divided into units of mini-frames as illustrated in FIG. 4, a UL/DL ratio can be flexibly set in units of mini-frames.

According to the exemplary embodiment of the present invention, a mini-frame as a minimum time unit may be used for the following processes.

① Support for a flexible DL/UL ratio

When a new communication system performs communication according to a TDD mode, a flexible DL/UL ratio can be supported by setting a ratio of a DL/UL region within a frame using the mini-frames. Specifically, a supportable DL/UL ratio through DL/UL symbol allocation in units of mini-frames each consisting of three OFDM symbols within a frame using a CP length of ⅛ Tu in a legacy mode may be (35, 12), (32, 15), (29, 18), or (26, 21). Namely, the maximum and minimum number of UL symbols can be supported in the legacy mode. In the above DL/UL ratio, it is assumed that one OFDM symbol within a DL region among 48 OFDM symbols within a frame is used for transmit transition gap (TTG)/receive transition gap (RTG).

The support for a flexible DL/UL ratio overcomes a problem which supports only a limited DL/UL ratio in minimum time granularity of units of a multiple of 3, for example, in 6, 9, and 12 OFDM symbols, without using a mini-frame consisting of three OFDM symbols.

Increase of Efficiency of Resource Allocation During Support for Heterogeneous Modes Through TDM When a new communication system proposed in the present invention performs communication supporting a dual mode including a legacy mode (IEEE 802.16e support mode) and a new mode, a mini-frame according to the exemplary embodiment of the present invention may be used to allocate a time region according to each mode of each communication scheme.

Figure 5:
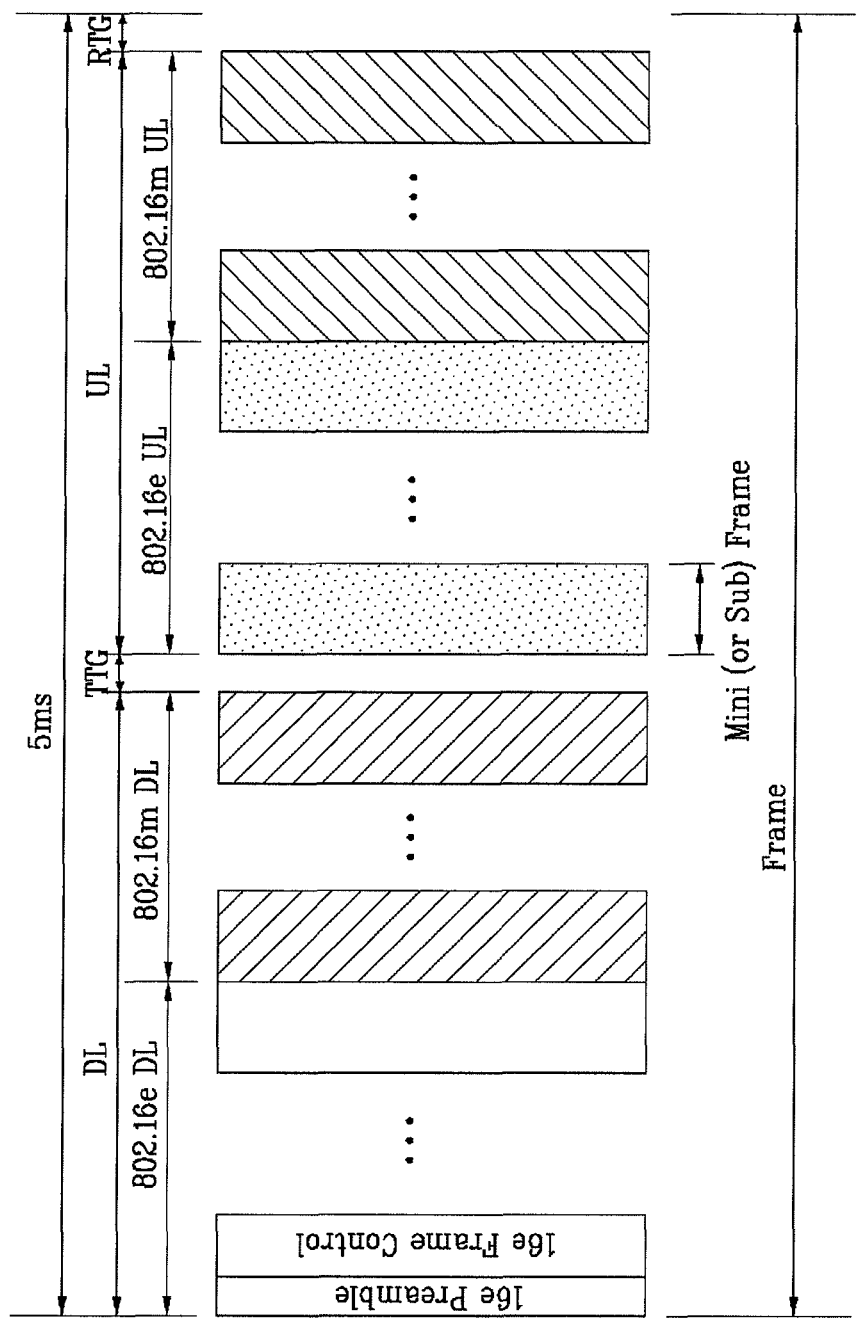
FIG. 5 illustrates an example of dividing a frame into DL and UL by a TDD scheme and allocating a legacy mode and a new mode by a TDM scheme according to an exemplary embodiment of the present invention.

Namely, in a new frame structure, a switching concept of a TDM region in the legacy mode is extended. When supporting heterogeneous modes within the same frame, time regions for a new mode and a conventional mode in DL/UL regions are allocated using mini-frames, thereby increasing flexibility of resource allocation. An example of a structure in which the legacy mode and the new mode within one frame are simultaneously allocated according to time is illustrated in FIG. 5 and a detailed construction thereof will be described hereinbelow.

Adaptive and/or Flexible TTI (or Sub-Frame) Configuration

Since a TTI or a sub-frame is comprised of one or more mini-frames in TDD or FDD, a flexible TTI/sub-frame configuration is possible. In this case, it is possible to differently construct TTI/sub-frame within one frame. Different TTI/sub-frame may also be constructed in units of a super-frame or a plurality of frames. Therefore, when differently constructing the sub-frames within each frame in units of a prescribed number of frames or sub-frames, flexibility of the frame/TTI structure design can be obtained using a mini-frame according to the exemplary embodiment of the present invention.

Information about the TTI/sub-frame configuration within one or more frames or super-frames may necessitate transmission of information about frame configuration in units of one or more frames or super-frames. The information about the frame configuration is transmitted by a transmitter through system configuration information or broadcasting information.

Hereinafter, a method for constructing the TTI/sub-frame using the concept of a mini-frame directly or indirectly will be described. To this end, advantages or disadvantages are described when constructing a TTI/sub-frame of a long length and a proper TTI/sub-frame structure is described.

When constructing a TTI/sub-frame of a long length, advantages and disadvantages are as follows.

(a) Advantages: since a small number of subchannels/sub-carriers is transmitted during a plurality of OFDM symbol durations, a gain is generated in terms of coverage. Further, since a supportable maximum media access control (MAC) packet data unit (PDU) size is increased, fixed overhead, for example, MAC header overhead and CRC may be reduced. Moreover, control signaling overhead of a frame unit is also reduced.

(b) Disadvantages: System performance may be deteriorated due to an increase in a CQI delay, HARQ delay, or DL/UL scheduling delay.

When constructing a TTI/sub-frame of a short length, the above-described advantages and disadvantages may be interpreted inversely. Accordingly, it is necessary to adaptively construct the TTI/sub-frame according to demanded system conditions/environments through a flexible frame structure.

A method for designing a frame structure for a legacy support mode using a CP length of ⅛ Tu will now be described.

Specifically, a structure using a mini-frame comprised of three OFDM symbols as a basic time unit is considered. In this case, since 48 OFDM symbols within one frame are divided into 16 mini-frames, a TDM construction is possible in which the 16 mini-frames are allocated on a time basis as a legacy mode and a new mode.

FIG. 5 illustrates an example of dividing a frame into DL and UL by a TDD scheme and allocating a legacy mode and a new mode by a TDM scheme according to an exemplary embodiment of the present invention.

In FIG. 5, an IEEE 802.16e mode may be interpreted as the legacy mode and an IEEE 802.16m mode may be interpreted as the new mode. The IEEE 802.16e mode and the IEEE 802.16m mode are discriminated in the time domain in units of mini-frames. Control channels may be differently constructed according to frames. The locations of the IEEE 802.16e mode and the IEEE 802.16m mode may be changed.

In the exemplary embodiment of the present invention, it is proposed that a sub-frame in TDD or FDD be comprised of one or more mini-frames.

Figure 6:
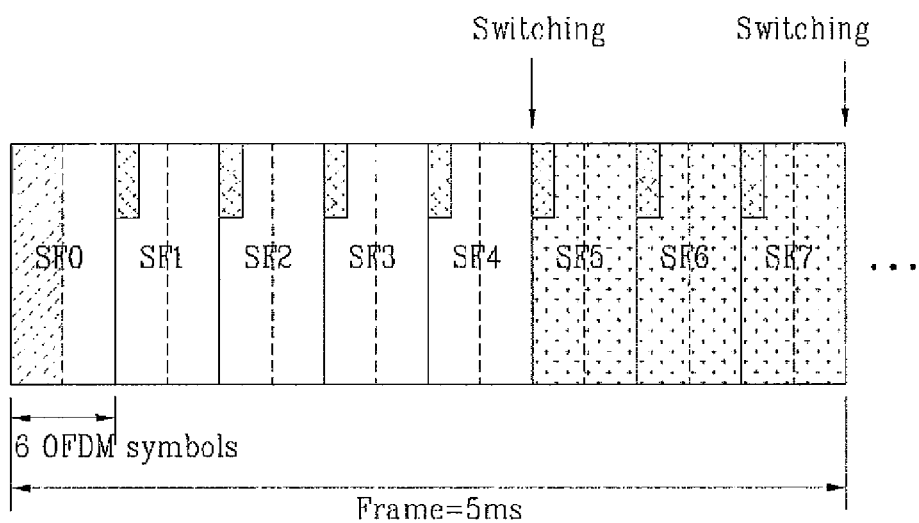
FIG. 6 illustrates an example of constructing a sub-frame with two mini-frames according to an exemplary embodiment of the present invention.

FIG. 6 illustrates an example of constructing a sub-frame with two mini-frames according to an exemplary embodiment of the present invention.

In FIG. 6, 'switching' indicates a switching time point of DL and UL resource regions in TDD. If a frame is constructed as illustrated in FIG. 6, one or more OFDM symbols and an idle time of sub-frames of the DL or UL region may be used as TTG/RTG.

DL/UL resources may be allocated on a sub-frame basis. In case of FDD, it may be interpreted as the case where 6 OFDM symbols constitute one sub-frame without switching shown in FIG. 6. Further, the frame structure illustrated in FIG. 6 may be interpreted as a frame structure in which a legacy support mode is released.

Control signaling may be allocated in units of sub-frames and one control signaling operation may be performed with respect to a plurality of sub-frames.

Figure 7:
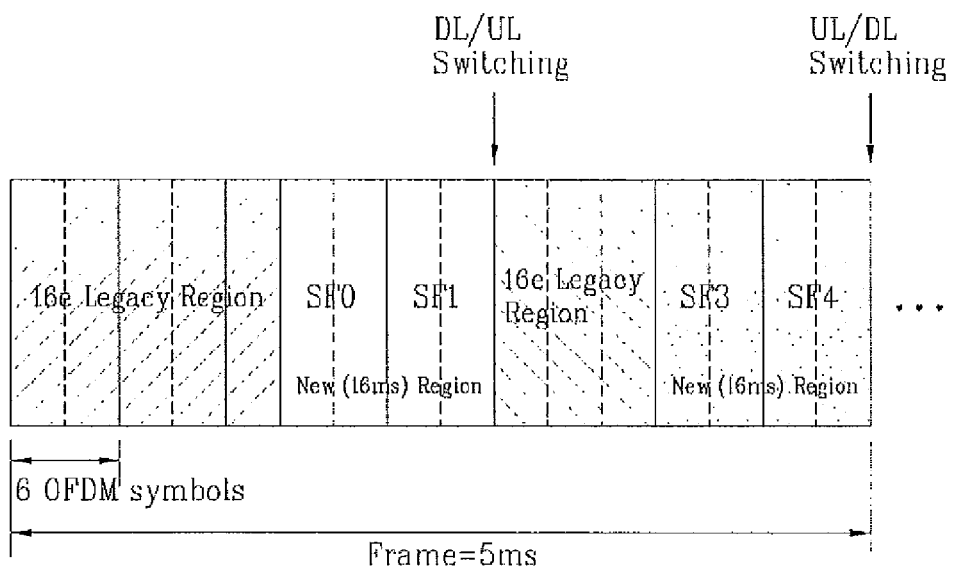
FIG. 7 illustrates an example of constructing a sub-frame with one or more mini-frames and allocating a legacy mode and a new mode by TDM.

When both a legacy mode and a new mode exist while using the frame structure through sub-frames comprised of one or more mini-frames as illustrated in FIG. 6, an example of allocating resources by dividing the respective modes by TDM is shown in FIG. 7.

FIG. 7 illustrates an example of constructing a sub-frame with one or more mini-frames and allocating a legacy mode and a new mode by TDM.

When a sub-frame in a new mode is comprised of 6 OFDM symbols (i.e., two mini-frames), it is impossible to allocate DL/UL resources in units of sub-frames as illustrated in FIG. 7.

More specifically, in FIG. 7, a DL/UL switching point is (27, 21) OFDM symbols and the number of OFDM symbols in each region is not a multiple of 6. Even though a problem of setting a DL/UL ratio is excluded, the legacy mode and the new mode are comprised of (15, 12) OFDM symbols in DL and of (9, 12) OFDM symbols in UL. Therefore, the number of OFDM symbols in each region is not a multiple of 6.

Therefore, a mini-frame configuration according to the present invention can maximize flexibility in TDM of the legacy mode and the new mode, as well as flexibility of the DL/UL ratio.

An example of a sub-frame configuration comprised of 6 OFDM symbols is shown. In an actual TDD configuration, DL/UL switching or division of the legacy and new mode regions may be defined by one DL/UL sub-frame.

When DL/UL switching is not employed, the sub-frame structure can be extended in an FDD construction. Then the DL/UL switching may be interpreted as a switching time point for DL/UL transmission in half duplex FDD (H-FDD). In FIG. 7, the locations of the legacy mode region and the new mode region may be changed.

Meanwhile, in the DL/UL switching for a TDD operation, a TTG/RTG is required. The TTG/RTG may be comprised of one or more OFDM symbols and an idle time at a switching point part. One OFDM symbol may be allocated for the TTG/RTG in the DL or UL region. At this time, to maintain the number of symbols in a subframe region allocated for a conventional legacy mode or a new mode as a multiple of 3, one OFDM symbol for TTG/RTG may function as a limited element for subchannelization or resource utilization.

The condition that the resource allocation in a specific region should be maintained as a multiple of 3 may due to application of the mini-frame structure proposed as described above for application of a new communication system. In order for the new system operating in a legacy support mode to identically operate in TDD and FDD in spite of an influence of TTG/RTG in TDD, the condition that the region allocation should maintain the number of OFDM symbols as a multiple of 3 should be satisfied in a new region rather than in a legacy region. Therefore, the exemplary embodiment of the present invention proposes allocation of one OFDM symbol for TTG/RTG using one OFDM symbol in the legacy region. Consequently, one OFDM symbol is reduced in the legacy region and this symbol may be interpreted as generating offset corresponding to one OFDM symbol at the start of a new region.

To prevent synchronization of the mini-frame (sub-frame) from being deviated due to the offset, the legacy region may be arranged after the new mode region.

A method has been described for designing the frame structure while maintaining the conventional CP length in the case where even the conventional legacy mode as well as the new communication mode should be supported. However, when it is necessary to support only the new communication mode, the condition of the conventional CP length does not need to be maintained. Hereinafter, an optical frame structure in a legacy non-support mode in which the legacy mode is not supported will be described.

If the new mode and the conventional mode are supported, the numerology condition of the conventional mode may be maintained. However, if only the new mode is supported, a CP length should be considered in more detail when designing a frame structure.

The CP length when generating OFDM symbols in a frame structure of IEEE 802.16m should consider the conventional CP length of ⅛ Tu in terms of legacy support. However, the CP length of the OFDM symbols may be determined to maintain orthogonality between subcarriers in consideration of characteristics of a radio channel and generally determines overhead less than 10%. As a radio channel model considered in current standards limits a maximum delay spread to 5 μs even in a TU channel. Therefore, it is desirable that the CP length be set to a minimum of 5 μs.

TABLE 2

| Channel Model | Mean Delay Spread (ns) | RMS Delay Spread (ns) | Max, Delay Spread (us) |
|---|---|---|---|
| Pedestrian A | 14.4 | 45 | 0.41 |
| Pedestrian B | 409.1 | 750 | 3.7 |
| Vehicular A | 254.4 | 370.4 | 2.51 |
| TU 6-ray Model | 705 | 1070 | 5 |

Since CP overhead is set to 10% or less of an available OFDM symbol length, signal-to-noise (SNR) loss caused by a CP is minimized. It is desirable to increase system throughput by increasing the number of OFDM symbols which can be transmitted. For example, when considering international standards using OFDM, 3rd generation partnership project (3GPP) long term evolution (LTE) has overall overhead of about 7% for unicast transmission in consideration of the CP length of 4.69 μs or 5.21 μs and ultra mobile broadband (UMB) maintains overhead of about 6% through the CP length of 6.51 μs. However, an IEEE 802.16e system considers CP overhead of 12.5% with the CP length of 11.42 μs (=⅛ Tu). Therefore, a reduction in CP overhead is demanded in terms of IEEE 802.16m. A CP range in IEEE 802.16m may be expressed by the following equation based on an available OFDM symbol length Tu (=92.4 μs) in consideration of the CP length of 5 μs or more and overhead of 10% or less.

$$\tfrac{1}{18}Tu(=5.08\mu s) < CP\ Length < \tfrac{1}{10}Tu(=9.14\mu s) \quad [\text{Equation 1}]$$

In setting the CP length within the above range, an OFDM signal including a CP is set to a multiple of an integral of the number of set samples according to a sampling rate and an FFT size. When considering that the FFT size is expressed as an exponential form of 2, the CP length in Equation 1 may be set to 1/16 Tu. Although the CP length of 1/16 Tu (−5.71 μs) is not indispensable in WiMAX Profile Rel 1.0, it is included in the current IEEE 802.16e standard. Accordingly, the CP length of 1/16 Tu is suitable for a CP length for unicast transmission in IEEE 802.16m standard when considering existing standards. It is necessary to use a CP length less than ⅛ Tu in terms of unicast as a CP length supporting a level of inter-site distance (ISD) of 500 m even in environments demanding a long CP length compared with a unicast scheme such as multicast broadcast single frequency network (MBSFN) as illustrated in FIG. B.

Figure 8:
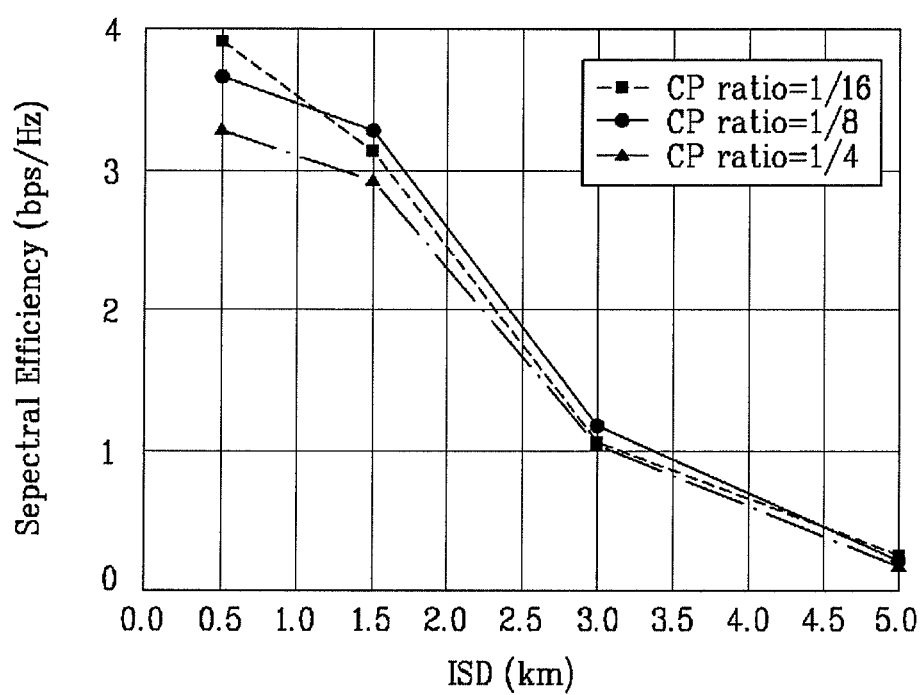
FIG. 8 is a graph illustrating MBS performance according to an influence of a CP length.

FIG. 8 is a graph illustrating multicast broadcast service (MBS) performance according to an influence of a CP length.

Advantages which can additionally be obtained by considering a CP length of 1/16 Tu compared with a CP length of ⅛ Tu are as follows. When using the CP length of ⅛ Tu, 48 OFDM symbols can be used within a 5 msec frame. However, when using the CP length of 1/16 Tu, 51 OFDM symbols can be used and thus spectral efficiency of more than 6% can additionally be obtained. Using the CP length of 1/16 Tu can extend a maximum data rate by utilizing three additionally obtained OFDM symbols as L1/L2 overhead of a preamble midamble, DL/UL control channel, sounding, measurement, TTG/RTG, etc.

A method for designing a frame using the CP length of 1/16 Tu will now be described as a specific exemplary embodiment of the present invention. Furthermore, a utilization method of the additionally available three OFDM symbols according to the CP length of 1/16 Tu will be described.

As shown in the above Table 1, if the CP length is 1/16 Tu, since the number of OFDM symbols in a 5 msec frame is 51, units of mini-frames each comprised of 3 OFDM symbols may be used for a TDD/FDD construction.

Figure 9:
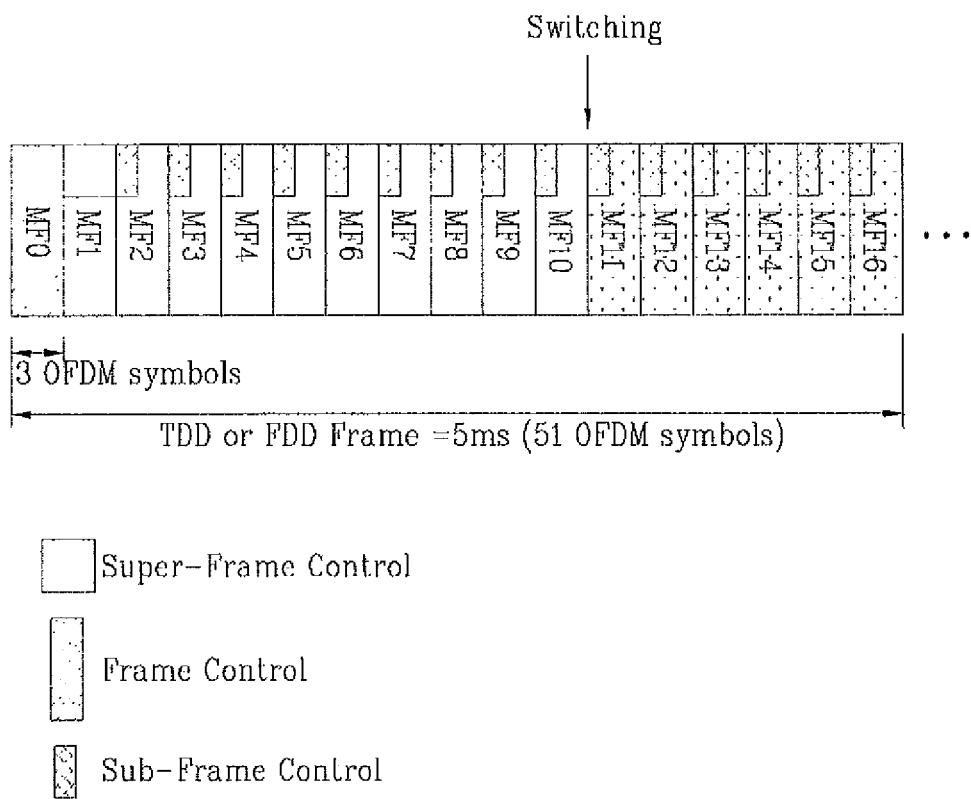
FIG. 9 illustrates a structure in which a CP length of $\frac{1}{16}$ Tu is used and a time unit is divided into mini-frames within a frame according to an exemplary embodiment of the present invention.

FIG. 9 illustrates a structure in which a CP length of 1/16 Tu is used and a time unit is divided into mini-frames within a frame according to an exemplary embodiment of the present invention.

Even though communication is performed in a legacy non-support mode, a frame is constructed in units of three OFDM symbols, because conventional subchannelization is defined in a legacy support mode and it is desirable to use the sub-channelization in the legacy non-support mode.

A frame configuration in units of mini-frames each comprised of three OFDM symbols is very short to be employed for a basic unit of one TTI in TDD/FDD. Namely, if a unit of three OFDM symbols is specified as one TTI, latency is decreased whereas an increase in overhead due to control signaling is severe. Moreover, a short TTI configuration has a disadvantage in terms of coverage.

Accordingly, a sub-frame configuration of a unit larger than three OFDM symbols is demanded. However, when maintaining the CP length of 1/16 Tu, since the number of OFDM symbols per frame is 51, it is impossible to construct the frame in units of symbol units other than units of 3 or 17 OFDM symbols.

To overcome this problem, the following two approaches are possible.

First, a part of OFDM symbols may be used for a preamble, TTG/RTG, midamble, common synchronization, sounding, measurement, etc.

Namely, for the same sub-frame configuration, a frame structure can be constructed by setting three OFDM symbols as a control symbol. The three OFDM symbols are used for a preamble, TTG/RTG, midamble, common synchronization, sounding, measurement, etc. and locations thereof may be arbitrarily set between 48 OFDM symbols.

FIGS. 10a and 10b illustrate examples of a frame configuration using three symbols as a preamble, midamble, sounding, etc. according to an exemplary embodiment of the present invention.

Specifically, FIG. 10a uses three OFDM symbols as a preamble, midamble, and TTG/RTG in a communication system of a TDD scheme. FIG. 10b uses three OFDM symbols to transmit control signals related to a preamble, midamble, sounding (UL), measurement, and MIMO, in a communication system of an FDD scheme. In the TDD scheme, the midamble may be used as a common synchronization symbol or a TTG/RTG, and locations of the three OFDM symbols may be changed.

Figure 10:
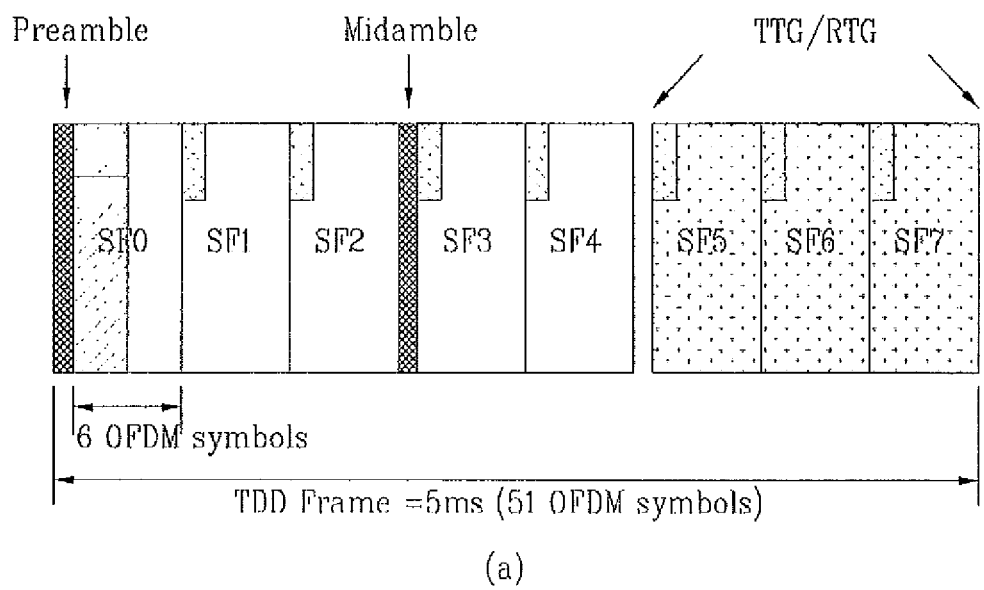
FIGS. 10a and 10b illustrate examples of a frame configuration using three symbols as a preamble, midamble, sounding, etc. according to an exemplary embodiment of the present invention.
Figure 10:
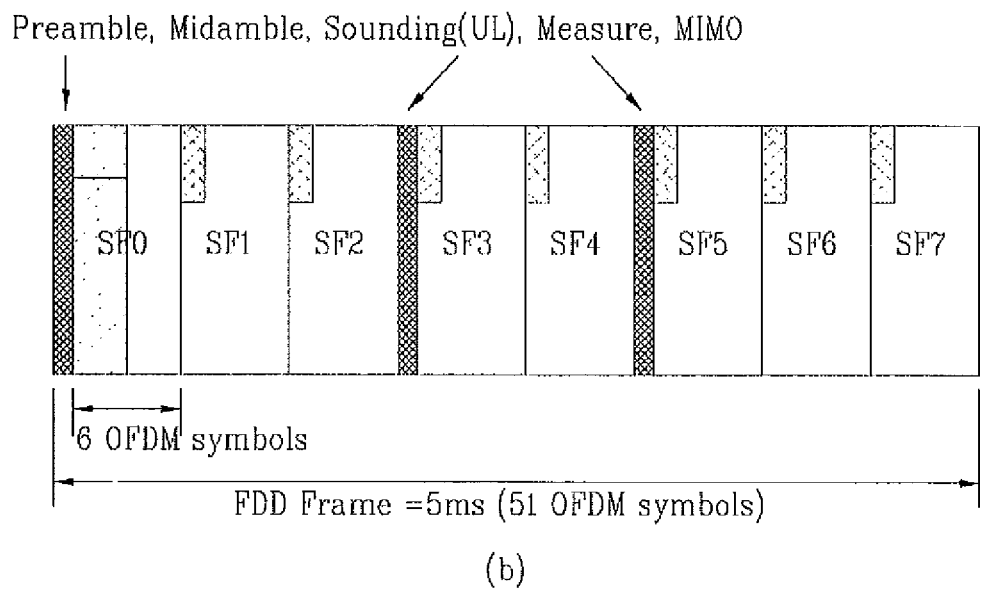

FIGS. 10 and 10b illustrate an example of constructing one sub-frame with 6 OFDM symbols corresponding to 2 mini-frames.

Although, in FIGS. 10 and 10b, three OFDM symbols are used to transmit control signals, the three OFDM symbols may be used for data transmission. Then a definition of the sub-frame may be specified as 6 or more OFDM symbols. Accordingly, a maximum of 9 OFDM symbols may constitute one sub-frame. All sub-frames within one frame do not need to have the same size. The number of OFDM symbols may be increased only in a sub-frame having the three additionally available OFDM symbols.

FIGS. 11a and 11b illustrate examples of constructing one sub-frame with 7 OFDM symbols rather than mini-frames as an example of a modification of the present invention.

Specifically, FIGS. 11a and 11b correspond to the cases of TDD and FDD, respectively and are applied as in FIG. 9. Namely, two OFDM symbols except for 49 OFDM symbols for subframe 0 to subframe 6 among 51 OFDM symbols may be used for a preamble and a TTG/RTG in TDD. In case of FDD, the two OFDM symbols may be used to transmit control information related to a preamble, midamble, sounding (UL), measurement, and MIMO.

Figure 11:
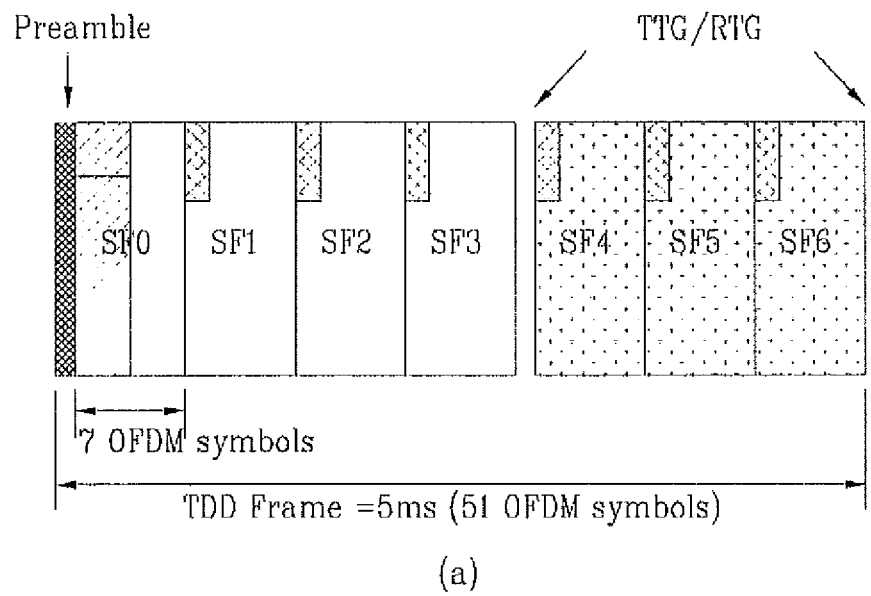
FIGS. 11a and 11b illustrate examples of constructing one sub-frame with 7 OFDM symbols rather than mini-frames as an example of modification of the present invention.
Figure 11:
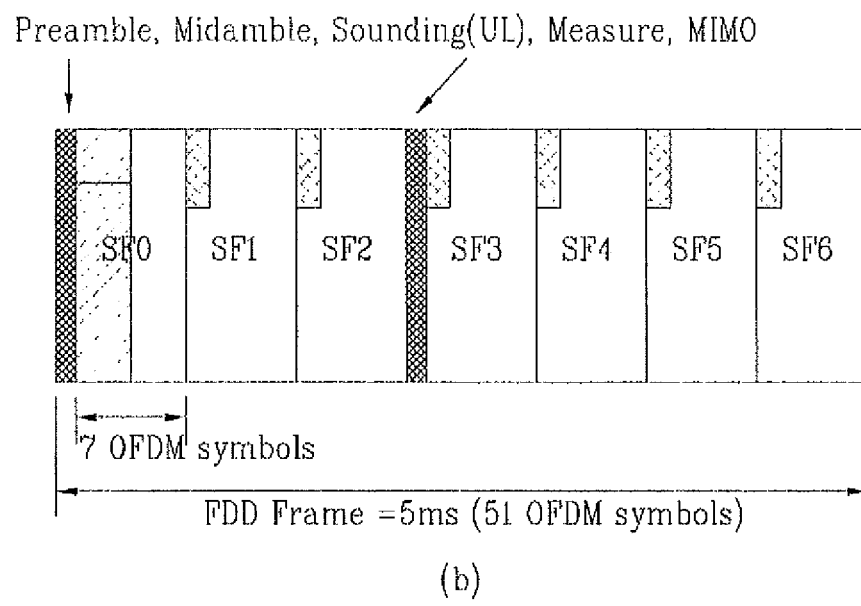
Figure 12:
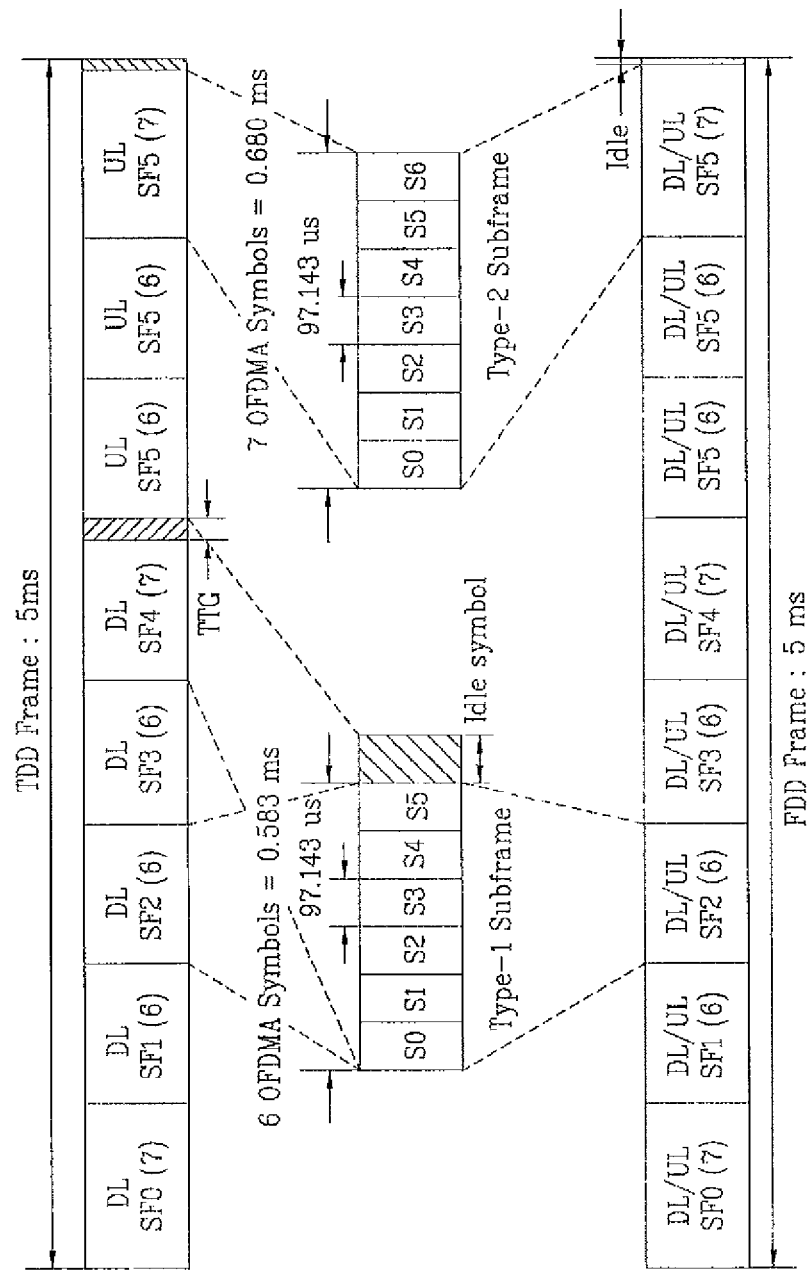
FIG. 12 illustrates a frame structure in which one subframe is comprised of 7 OFDMA symbols as in FIG. 11 according to an exemplary embodiment of the present invention.

FIG. 12 illustrates a frame structure in which one sub-frame is comprised of 7 OFDMA symbols as in FIG. 11 according to an exemplary embodiment of the present invention.

FIG. 12 shows a sub-frame type 1 in which one OFDMA symbol of a sub-frame comprised of 7 OFDM symbols in TDD is used for TTG/RTG and 6 OFDMA symbols constitute one sub-frame, and a sub-frame type 2 in which 7 OFDMA symbols constitute one sub-frame. OFDMA symbols for transmission of control signals related to a preamble, midamble, sounding, measurement, and MIMO, and OFDM symbols for transmission for midamble in TDD may be used for a common synchronization symbol or a TTG/RTG, and for measurement of interference, a carrier to interference-plus-noise ratio (CINR), a receive signal strength indicator (RSSI), CQI, etc. Since the location of the symbol for transmission of additional information uses one of the 7 OFDMA symbols in FIG. 7, a sub-frame comprised of the conventional 6 OFDMA symbols may be applied.

Although FIG. 10a to FIG. 11b are shown assuming that a control channel is transmitted every sub-frame, the common channel may be transmitted in units of two or more sub-frames.

In another method for constructing a sub-frame (TTI) of three or more OFDM symbols while using the CP length of 1/16 Tu, one or more mini-frames each comprised of three OFDM symbols may be used for a preamble, DL/UL control channel, feedback channel for CQI, A/N, BR, TTG/RTG, etc.

As illustrated in FIG. 9, in the 5 msec frame structure including 17 mini-frames each consisting of three OFDM symbols, a sub-frame or a minimum one TTI unit may be set such that one mini-frame or an odd number of mini-frames is used for transmission of non-data and the remaining mini-frames may be used for transmission of data constituting the sub-frames.

Figure 13:
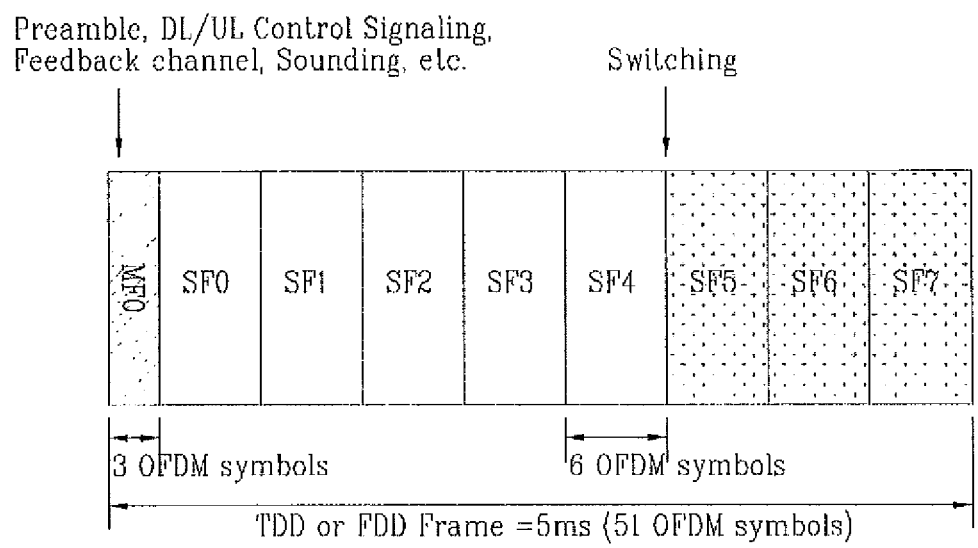
FIG. 13 illustrates an example of using one mini-frame for preamble (DL), DL/UL control signaling (DL), feedback channel (FDD-UL), etc. according to an exemplary embodiment of the present invention.

FIG. 13 illustrates an example of using one mini-frame for preamble (DL), DL/UL control signaling (DL), feedback channel (FDD-UL), etc. according to an exemplary embodiment of the present invention.

An odd-number of Mini-frames are used for transmission of non data and the remaining mini-frames may be used for transmission of data. The number of subframes and the number of mini-frames for transmission of non data within a 5 msec frame may have 8 cases of (8,1), (7,3), (6,5), (5,7 ), (4,9), (3,11), (2,13), and (1,15).

In FIG. 13, the locations of three OFDM symbols corresponding to mini-frame MF0 and usage thereof may be modified.

An example of using another CP length except for the CP lengths of 1/8 Tu and 1/16 Tu will now be described.

When considering a maximum delay spread in a TU channel and a margin of a guard time in case of the CP length of 1/16 Tu, a longer CP length may be demanded to ensure orthogonality due to an influence of a channel of an OFDM signal. To this end, although not shown in the above Table 1, a CP length of 1/12 Tu may be used and included as follows.

TABLE 3

|  | Transmission Bandwidth (MHz) | | |
| --- | --- | --- | --- |
|  | 5 | 10 | 20 |
| Sampling Frequency (MHz) | 5.6 | 11.2 | 22.4 |
| FFT Size | 512 | 1024 | 2048 |
| Sub-Carrier Spacing (kHz) | 10.94 | 10.94 | 10.94 |
| Tu (us) | 91.4 | 91.4 | 91.4 |

| CP Length | Ts (us) | Number of OFDM Symbols per Frame | Idle Time (us) |
| --- | --- | --- | --- |
| Tg = 1/4 Tu | 91.4 + 22.85 = 114.25 | 43 | 87.25 |
| Tg = 1/8 Tu | 91.4 + 11.42 = 102.82 | 48 | 64.64 |
| Tg = 1/12 Tu | 91.4 + 7.62 = 99.02 | 50 | 49.17 |
| Tg = 1/16 Tu | 91.4 + 5.71 = 97.11 | 51 | 47.39 |
| Tg = 1/32 Tu | 91.4 + 2.86 = 94.26 | 53 | 4.22 |

As shown in Table 3, when using the CP length of 1/12 Tu (about 7.62 μs), a total of 50 OFDM symbols is included in one frame. In this case, an actual CP length may be set to a maximum of 9.6 μs or less for 50 OFDM symbols (in consideration of a variable idle time).

Figure 14:
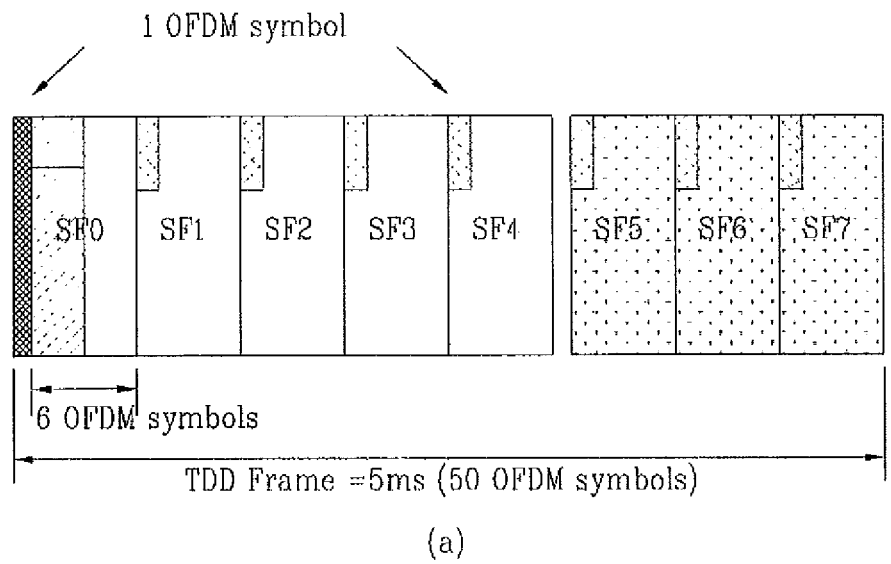
FIGS. 14a and 14b illustrate frame structures each comprised of 50 OFDM symbols by constructing one sub-frame with two mini-frames according to an exemplary embodiment of the present invention.
Figure 14:
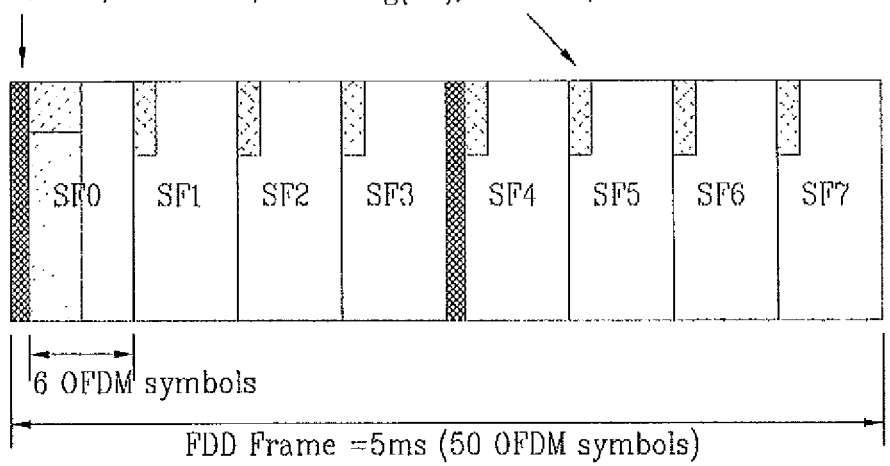

FIGS. 14a and 14b illustrate frame structures each comprised of 50 OFDM symbols by constructing one sub-frame with two mini-frames according to an exemplary embodiment of the present invention.

Specifically, FIGS. 14a and 14b correspond to the cases of TDD and FDD, respectively. The length of a sub-frame may be a multiple of a mini-frame. In the TDD structure as shown in FIG. 14a, one OFDM symbol is used for each of a preamble and a TTG/RTG and the remaining 48 OFDM symbols may constitute sub-frames.

In the FDD structure shown in FIG. 14b, one OFDM symbol may be used for a preamble, and one other OFDM symbol may be used for pilot transmission related to a midamble, common synchronization symbol, measurement, sounding, or MIMO. The usage of two OFDM symbols is interchangeable.

The exemplary embodiments of the present invention have described the IEEE 802.16e system as a conventional system and the IEEE 802.16m system as a new system but may be used in any communication system as a method for constructing an efficient frame using the same principle.

According to the present invention, a new frame structure can support heterogeneous modes and can be flexibly applied to different duplex schemes.

Such a frame structure flexibly supports an IEEE 802.16e system and can effectively design a new IEEE 802.16m frame structure. The frame structure can support heterogeneous modes and perform smooth migration to a single-mode frame configuration.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a signal in a communication system which supports a time division duplexing (TDD) mode and supports two or more different communication schemes, the method comprising:
   constructing the signal in a unit of a frame and transmitting the signal,
   wherein the two or more communication schemes include a communication scheme of an IEEE 802.16e system,
   wherein the frame includes a first region for the communication scheme of the IEEE 802.16e system and a second region for the communication scheme except for the IEEE 802.16e system,
   wherein the second region consists of a plurality of subframes, each of the plurality of subframes having a length equal to a multiple of 3 orthogonal frequency division multiplexing (OFDM) symbols,
   wherein the plurality of subframes includes at least two groups,
   wherein a first group of the at least two groups includes a subframe having length of 6 OFDM symbols, and
   wherein a second group of the at least two groups includes a subframe having length of 9 OFDM symbols.

2. The method of claim 1,
   wherein the first and second regions are divided according to a time division multiplexing (TDM) scheme.

3. The method of claim 1, wherein, when the communication system communicates in a mode which does not support the IEEE 802.16e communication scheme, the frame is set to have a minimum cyclic prefix length within a range which can support a channel having a maximum influence of a delay spread among used channels.

4. The method of claim 3, wherein, when the communication system communicates in the mode which does not support the IEEE 802.16e communication scheme, the cyclic prefix length is set to 1/16 of an effective OFDM symbol length.

5. The method of claim 4, wherein OFDM symbols of a number corresponding to a difference between the number of OFDM symbols within the frame and a multiple of m are used for at least one of a preamble, midamble, UL or DL sounding signal transmission, transmit transition gap (TTG), receive transition gap (RTG), data transmission, and control signal transmission.

6. The method of claim 1,
   wherein, when the communication system communicates in a mode which does not support the IEEE 802.16e communication scheme, the frame is 5 msec or more and is set to have a cyclic prefix length corresponding to a length obtained by dividing an effective OFDM symbol length by an exponent of 2.

7. The method of claim 6, where the cyclic prefix length is set to 1/16 of effective OFDM symbol length.

8. The method of claim 7, wherein sub-frames within the frame are comprised of units of 6 OFDM symbols.

9. The method of claim 7, wherein the frame includes 51 OFDM symbols, and OFDM symbols of a number corresponding to a multiple of an odd number of a specific unit comprised of three OFDM symbols are used for at least one of a preamble, midamble, UL or DL sounding signal transmission, transmit transition gap (TTG), receive transition gap (RTG), data transmission, and control signal transmission.

10. The method of claim 9, wherein, when the OFDM symbols of the number corresponding to the multiple of the odd number of the specific unit comprised of three OFDM symbols are used for the data transmission, one or more sub-frames within the frame are comprised of units of more than 6 OFDM symbols.

11. The method of claim 3, where the cyclic prefix length is set to 1/16 of effective OFDM symbol length.

12. The method of claim 11, wherein sub-frames within the frame are comprised of units of 6 OFDM symbols.

13. The method of claim 11, wherein the frame includes 51 OFDM symbols, and OFDM symbols of a number corresponding to a multiple of an odd number of a specific unit comprised of three OFDM symbols are used for at least one of a preamble, midamble, UL or DL sounding signal transmission, transmit transition gap (TTG), receive transition gap (RTG), data transmission, and control signal transmission.

14. The method of claim 13, wherein, when the OFDM symbols of the number corresponding to the multiple of the odd number of the specific unit comprised of three OFDM symbols are used for the data transmission, one or more sub-frames within the frame are comprised of units of more than 6 OFDM symbols.

15. The method of claim 1, wherein the frame includes an IEEE802.16e downlink region, an IEEE802.16m downlink region, an IEEE802.16e uplink region, and an IEEE802.16m uplink region, in sequence.

* * * * *